(12) United States Patent
Yip et al.

(10) Patent No.: US 10,770,032 B2
(45) Date of Patent: Sep. 8, 2020

(54) METHOD AND APPARATUS FOR PROCESSING IMAGE IN VIRTUAL REALITY SYSTEM

(71) Applicant: Samsung Electronics Co., Ltd., Suwon-si, Gyeonggi-do (KR)

(72) Inventors: Eric Yip, Seoul (KR); Byeong-Doo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/998,936

(22) PCT Filed: Feb. 17, 2017

(86) PCT No.: PCT/KR2017/001804
§ 371 (c)(1),
(2) Date: Aug. 17, 2018

(87) PCT Pub. No.: WO2017/142364
PCT Pub. Date: Aug. 24, 2017

(65) Prior Publication Data
US 2019/0197990 A1    Jun. 27, 2019

(30) Foreign Application Priority Data
Feb. 17, 2016    (KR) .................. 10-2016-0018507

(51) Int. Cl.
*G09G 5/14*    (2006.01)
*H04N 5/232*    (2006.01)
(Continued)

(52) U.S. Cl.
CPC ............... *G09G 5/14* (2013.01); *G06T 19/00* (2013.01); *G09G 5/373* (2013.01); *H04N 5/232* (2013.01);
(Continued)

(58) Field of Classification Search
CPC .. G09G 5/14; G09G 5/373; G09G 2320/0276; G09G 2320/0686;
(Continued)

(56) References Cited

U.S. PATENT DOCUMENTS

2003/0133019 A1    7/2003    Higurashi et al.
2011/0148907 A1*    6/2011    Lee ...................... G09G 3/2003
                                                                      345/590

(Continued)

FOREIGN PATENT DOCUMENTS

JP          10-187929 A       7/1998
KR    10-2011-0130137 A    12/2011
KR    10-2014-0088903 A     7/2014

OTHER PUBLICATIONS

European Search Report; Application No. 17753525.9-1209; dated Nov. 22, 2018.

*Primary Examiner* — Xilin Guo
(74) *Attorney, Agent, or Firm* — Jefferson IP Law, LLP

(57) ABSTRACT

The present disclosure proposes a solution in which an electronic device configures at least one view window existing in an image frame including a plurality of post-processing areas, identifies a plurality of division areas obtained by dividing the configured view window by the plurality of post-processing areas, obtains a compensation parameter on the basis of the plurality of identified division areas, and processes an image in the view window using the obtained compensation parameter.

20 Claims, 8 Drawing Sheets

(a)

(b)

(51) Int. Cl.
*H04N 5/262* (2006.01)
*H04N 5/265* (2006.01)
*G06T 19/00* (2011.01)
*H04N 21/81* (2011.01)
*H04N 19/597* (2014.01)
*G09G 5/373* (2006.01)
*G06T 5/00* (2006.01)
*G06T 5/20* (2006.01)

(52) U.S. Cl.
CPC ............ *H04N 5/262* (2013.01); *H04N 5/265* (2013.01); *H04N 19/597* (2014.11); *H04N 21/816* (2013.01); *G06T 5/002* (2013.01); *G06T 5/003* (2013.01); *G06T 5/20* (2013.01); *G06T 2207/20021* (2013.01); *G06T 2207/20192* (2013.01); *G09G 2320/0276* (2013.01); *G09G 2320/0666* (2013.01); *G09G 2320/0686* (2013.01)

(58) Field of Classification Search
CPC ... G09G 2320/0666; G06T 5/20; G06T 19/00; G06T 5/002; G06T 2207/20192; G06T 2207/20021; G06T 5/003; G06T 15/20; G06T 3/4038; G06T 15/205; H04N 5/262; H04N 5/265; H04N 21/816; H04N 19/597; H04N 5/232; H04N 5/23238; H04N 13/111; G06F 3/04886; G06F 3/0484; G06F 1/1637; G06F 3/038; G06F 3/04847; G06F 3/14; G06F 3/147; H04L 51/046; H04L 41/0813

See application file for complete search history.

(56) References Cited

U.S. PATENT DOCUMENTS

| | | |
|---|---|---|
| 2011/0170606 A1 | 7/2011 | Zhang et al. |
| 2012/0169842 A1* | 7/2012 | Chuang ............ G08B 13/19619 348/39 |
| 2013/0083068 A1* | 4/2013 | Lethers .................... G09G 5/00 345/634 |
| 2013/0113827 A1 | 5/2013 | Forutanpour et al. |
| 2013/0162687 A1* | 6/2013 | Lee ........................ G06T 5/00 345/660 |
| 2014/0098185 A1 | 4/2014 | Davari et al. |
| 2014/0160101 A1* | 6/2014 | Chen .................... G06F 3/1446 345/207 |
| 2014/0307045 A1 | 10/2014 | Richardt et al. |
| 2014/0321766 A1* | 10/2014 | Jo ...................... H04N 5/23254 382/255 |
| 2015/0035857 A1 | 2/2015 | Lowe et al. |
| 2015/0339822 A1 | 11/2015 | Onda et al. |
| 2016/0037068 A1 | 2/2016 | Jenny et al. |

* cited by examiner (a)

(b)

(a)

(b)

METHOD AND APPARATUS FOR PROCESSING IMAGE IN VIRTUAL REALITY SYSTEM

CROSS-REFERENCE TO RELATED APPLICATION(S)

This application is a U.S. National Phase Entry of PCT International Application No. PCT/KR2017/001804, which was filed on Feb. 17, 2017, and claims priority to Korean Patent Application No. 10-2016-0018507, which was filed on Feb. 17, 2016, the contents of which are incorporated herein by reference.

TECHNICAL FIELD

The present disclosure relates to a method and apparatus for processing an image based on an area of a view window in a virtual reality system.

BACKGROUND ART

A consumer media content (e.g., a two dimension (2D)-content, a 3D content, and/or the like) has been evolved from a black content and a white content to a color content, a high definition (HD) content, a ultra high definition (UHD) content, and/or the like. Recently, the standardization for a high dynamic range (HDR) content has been established and promoted. Meanwhile, a virtual reality (VR) content has not been evolved before VR products were introduced.

A characteristic of a VR content is different from characteristics of existing 2D and 3D contents. The VR content may provide a user with a 360 degree-experience and thus completely immerse the user in the experience. However, if the user views many different views during short time, image mismatch may occur due to a change in a displayed view.

A virtual reality ecosystem (VR ecosystem) is a system which displays a space of an fictional world or a remote location using various videos or a computer graphic, and makes a user to feel as if the user exists at the space by converting the user's motion using a computer. The user is capable of interacting with the virtual reality ecosystem by adjusting a controller, and/or the like.

The virtual reality ecosystem may include a display device such as a head mounted display (HMD), cave automatic virtual environments (CAVE), a monitor, and/or the like, a control device for receiving a user's input such as haptics, and/or the like, a VR content to be displayed on the display device, an app store which will provide the VR content, and/or the like. The display device may perform a function of the control device. The virtual reality ecosystem may be used in various fields such as education, health care, real estate, construction, travel, and/or the like. In addition, there is a need for a technology such as an image processing technology such as image stitching, a 3D engine, and/or the like for supporting the virtual reality ecosystem.

In the virtual reality ecosystem, motion feedback that the user can input to the virtual reality ecosystem through the control device may be divided by a bearing (that is, rotation) and movement (that is, position change). The virtual reality ecosystem should provide a VR content according to the user's feedback.

In virtual reality experience, a field of view (FOV) provided to the user through the display device is also important. A human's general horizontal field of view (or an angle of field) is about 200 degrees. In the 200 degrees, 120 degrees overlap in three dimensions. The display device (for example, an HMD) has a field of view of 100 to 120 degrees. In the 120 degrees, 60 degrees correspond to tunnel vision.

In the VR ecosystem, a field of regard (FOR) corresponds to the human's field of view. The FOR means a degree of spaces that surround the user in the VR ecosystem. For example, the HMD has 100% of FOR. The reason is that the HMD provides a continuously changed view even though the user moves. The FOR of CAVE is dependent on the number of walls used as virtual screens. In contrast, televisions or monitors have a very restricted FOR value. The reason is that VR exists only in the television or the monitor in front of the user and is abruptly discontinued outside the television or the monitor. Accordingly, it is difficult to show VR content through the television or the monitor.

Even if a size of the television or a size of the monitor becomes large for preventing sudden disconnection of a virtual world, it is difficult to provide a VR content which may allow a user to experience the virtual world. The reason is why a phenomenon that a plurality of images which compose an entire vision of the VR content are enlarged when part of the VR content is enlarged and the enlarged part is viewed, difference among the enlarged images is exaggerated, so the difference among the images is remarkable occurs, that is, image mismatch occurs. In addition, a phenomenon that the same image is differently viewed due to user's frequent movements in a case that an image showed in a VR content is changed may be an image mismatch-phenomenon. So, there is a post-processing operation for a VR content in order to display the VR content with relatively low resolution on a large monitor for providing the VR content for a virtual world on the large monitor.

DETAILED DESCRIPTION OF THE INVENTION

Technical Problem

An object of the present disclosure is to provide an image which is processed based on an area included in a view which display devices such as an HMD and a monitor will display.

An object of the present disclosure is to solve an image mismatch-phenomenon which may occur in an image provided to a user in a virtual reality ecosystem.

An object of the present disclosure is to solve an image mismatch-phenomenon which may occur in a case of enlarging a 360 degree-image.

Technical Solution

Various embodiments of the present disclosure provide a method for processing an image frame for a virtual reality content in an electronic device, and the method may include setting at least one view window which exists in an image frame including a plurality of post-processing areas, identifying a plurality of division areas which are divided in the set view window by the plurality of post-processing areas, obtaining a compensation parameter based on the plurality of identified division areas, and processing an image within the view window using the obtained compensation parameter.

Various embodiments of the present disclosure provide an electronic device for processing an image frame for a virtual reality content, and the electronic device may include a controller configured to set at least one view window which exists in an image frame including a plurality of post-processing areas, to identify a plurality of division areas which are divided in the set view window by the plurality of post-processing areas, to obtain a compensation parameter based on the plurality of identified division areas, and to process an image within the view window using the obtained compensation parameter, and a display unit configured to display the processed image.

Effect of the Invention

According to the present disclosure, an image for which an image mismatch-phenomenon is removed may be provided to a user in a virtual reality ecosystem.

According to the present disclosure, an image in which there is no image mismatch-phenomenon may be provided in a case of enlarging a 360 degree-image.

MODE FOR CARRYING OUT THE INVENTION

An embodiment of the present disclosure will be described with reference to the accompanying drawings. In the following description of the present description, a detailed description of known functions and components will be omitted if it is determined that the detailed description of known functions and components may make a subject matter of the present disclosure rather unclear. Further, the terms to be described below are the terms which are defined by considering functions in the present disclosure, and may vary according to user's intention, operator's intention, a custom, and/or the like. So, the definition should be based on the contents throughout this specification.

Figure 1:
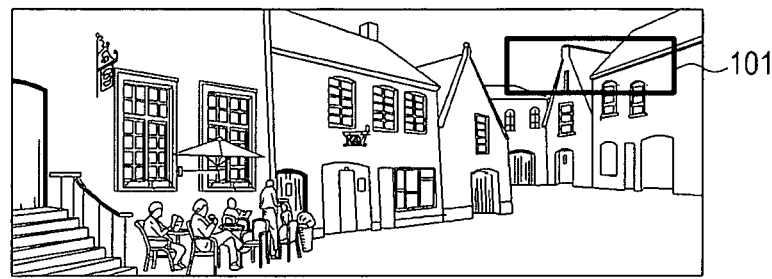
FIG. 1 illustrates a diagram for explaining terminologies to be used in the present disclosure.
Figure 1:
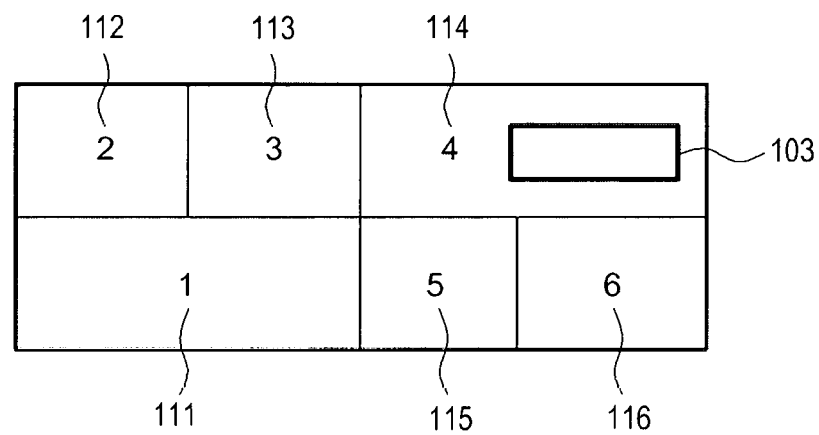

FIG. 1 illustrates a diagram for explaining terminologies to be used in the present disclosure.

FIG. 1 illustrates a diagram for explaining '360 degree-image' and 'view window' as shown in (a).

That is, (a) in FIG. 1 shows an example of a 360-degree image (or a 360-degree image frame, and hereinafter, '360-degree image') which a user may view in a virtual reality system. The 360-degree image is a 360-degree image which is viewed at a specific location. If a viewing location is changed, the 360-degree image may be changed due to difference in a degree of closeness or a degree of farness, and/or the like. A VR content may be a specific example of the 360-degree image.

For example, a plurality of cameras capture images at the same time and a 360-degree image may be generated by connecting the captured images. For another example, one camera captures images while rotating and a 360-degree image may be generated by connecting the captured images. At this time, various image (or video) processing algorithms, e.g., a stitching algorithm may be used for connecting the captured images.

Like this, a 360-degree image may be an image generated by combining a plurality of images. It may not be a problem that the 360-degree image is viewed at once as a whole. However, if only a specific part is enlarged and a plurality of images are combined in the specific part, an image mismatch-phenomenon may occur.

In a virtual reality system, an image which a user views at a moment may be a specific part 101 of the 360-degree image, not the whole 360-degree image. If the user moves (for example, a user's location or viewing point is changed), the user may view another specific part, not the specific part 101. In the present disclosure, a specific part (e.g., the specific part 101) of an 360-degree image which a user may view will be referred to as view window. Herein, the view window is shown as a rectangle, however, the view window may not be limited to the rectangle. For example, the view window may have a unspecific form as well as a circular form and an oval form.

FIG. 1 illustrates a diagram for explaining 'area' defined in the present disclosure as shown in (b).

In the present disclosure, 'area' means a unit image which occupies all or part of a 360 degree-image. The unit image is an image which geometrically occupies an area of all or part of the 360 degree-image, so the unit image will be referred to as 'area image' or 'area'. The area may be divided based on a parameter value required for processing the 360 degree-image. Alternatively, the area may be determined by a provider which provides the 360 degree-image.

The parameter may be at least one of illumination, a deblocking filter parameter, a sharpening parameter, a unsharpened parameter, a blurring parameter, a denoising parameter, a color, a gamma correction parameter, light, and/or the like. Hereinafter, the illumination will be described as an example of the parameter.

The parameter may be a constant with one value, or a matrix with a plurality of values.

Since all of a 360-degree image is processed first and the area is processed, so the 'area' may be referred to as 'post-processing area'.

Further, (b) in FIG. 1 shows that a 360 degree-image in (a) in FIG. 1 is divided into six areas 111, 112, 113, 114, 115, and 116 as an embodiment.

A view window 103 of (b) in FIG. 1 indicates a part which corresponds to a view window 101 in (a) in FIG. 1.

In (b) in FIG. 1, the 360-degree image is divided into the six areas, however, the number of area(s) which composes the 360-degree image, a size (e.g., a minimum size and a maximum size) of each area, and/or the like may be varied and may not be limited. Further, a shape of an area is not limited to a quadrangle.

Figure 2:
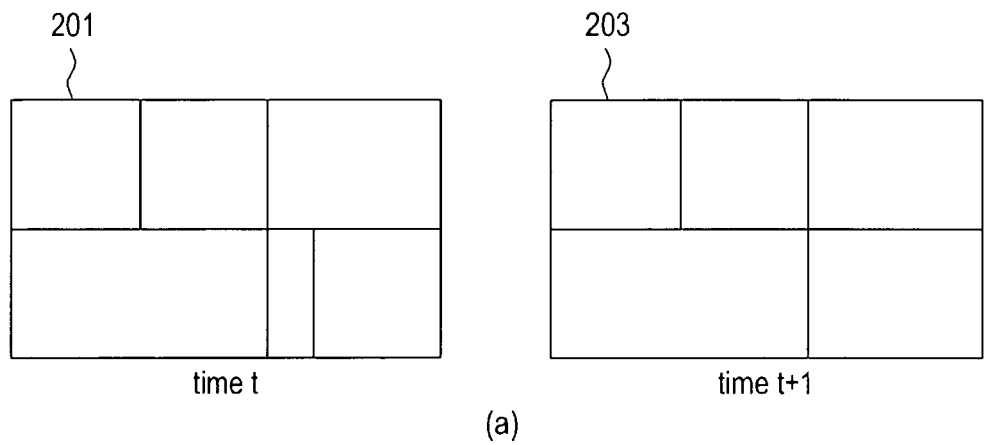
FIG. 2 illustrates a diagram for explaining a case that an image mismatch-phenomenon occurs.
Figure 2:
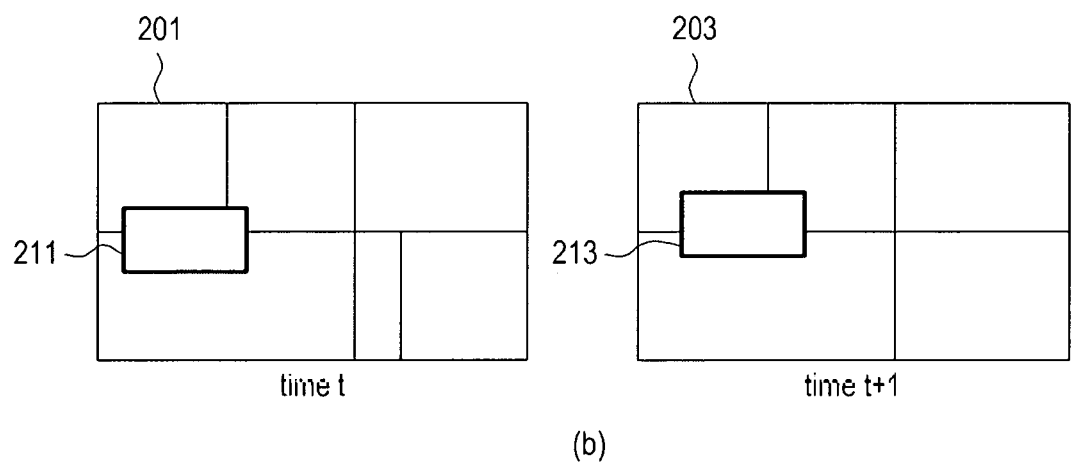

FIG. 2 illustrates a diagram for explaining a case that an image mismatch-phenomenon occurs.

FIG. 2 illustrates a diagram for showing a change in a 360 degree-image according to a change in time as shown in (a).

The first 360-degree image 201 indicates a 360-degree image at time t. The first 360-degree image 201 includes total six areas. The second 360-degree image 203 indicates the 360-degree image at time t+1. The second 360-degree image 203 includes total five areas. A size of area and the number of areas included in the 360-degree image at the time t are different from a size of area and the number of areas included in the 360-degree image at the time t+1. Further, a value of a parameter for processing each area at the time t may be different from a value of a parameter for processing each area at the time t+1.

FIG. 2 illustrates a diagram for showing a change in a view window according to a change in time as shown in (b).

The first view window 211 indicates a view window in the 360-degree image 201 at time t. The first view window 211 is located across total three areas. From another viewing point, the first view window 211 includes total three areas. The second view window 213 indicates a view window in the 360-degree image 203 at time t+1. The second view window 213 is located across the same as the three areas of the first view window 211. However, a size and a proportion of each area included in the first view window 211 are different from a size and a proportion of each area included in the second view window 213.

In a case that a device processes the three areas included in the first view window 211 at the time t, the device applies a parameter value which corresponds to each of the three areas to each of the three areas. If difference among the three parameter values is big, it may be viewed like that the first view window 211 is divided into a plurality of areas by boundary lines of the three areas. For example, if the parameter is illumination, three areas to be rendered which composes the first view window 211 may be viewed as separate images due to difference of brightness among the three areas. This phenomenon in which a view window is viewed as a plurality of images, not one image may be an image mismatch-phenomenon. The present disclosure describes a method of processing an image of a view window by considering an area included in the view window for decreasing the image mismatch-phenomenon.

Figure 3:
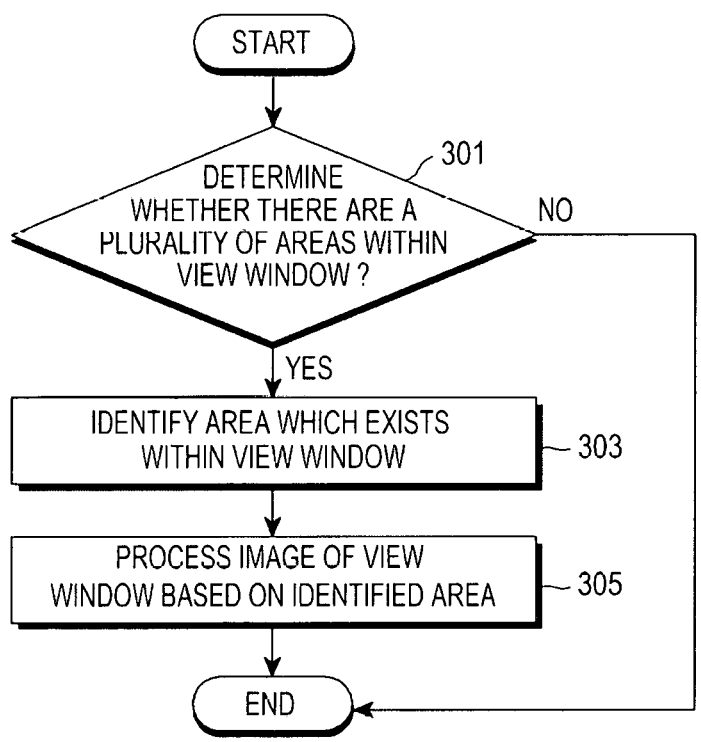
FIG. 3 illustrates a flow chart showing a method of processing a view window according to the present disclosure in a device.

FIG. 3 illustrates a flow chart showing a method of processing a view window according to the present disclosure in a device.

The device determines whether there are a plurality of areas within a view window (301).

If there are the plurality of areas within the view window, the device identifies an area which exists within the view window (303).

The device processes an image of the view window based on the identified area (305).

At this time, the area is an area which is identified according to a value of a parameter required when an image of the area is processed. So, if a type of parameter required when an image is processed is changed, an area, a layout, and/or the like of the areas which compose a 360 degree-image may be changed.

A processing process after the area is identified will be described with reference to the following embodiment.

The first embodiment of the present disclosure is a method for processing an image of a view window by applying a weight to each area within a view window.

Figure 4:
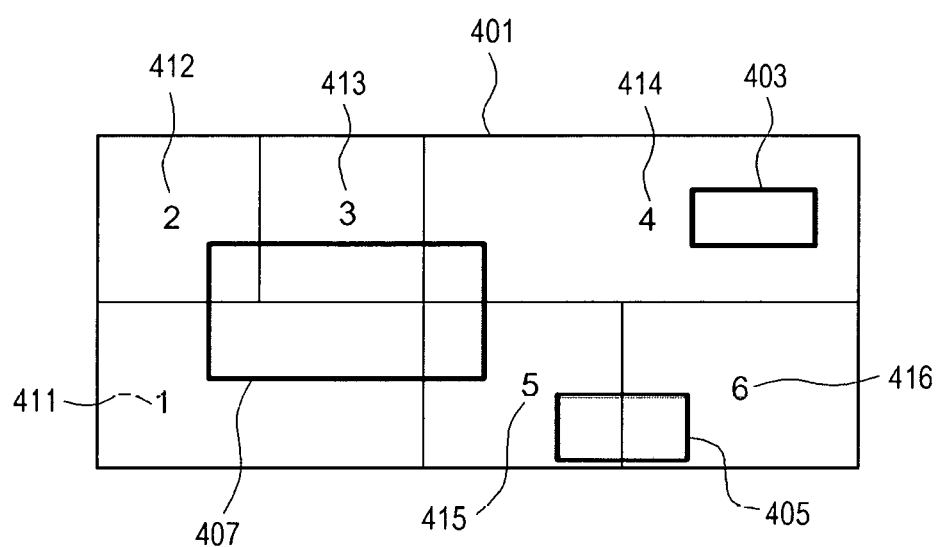
FIG. 4 illustrates a diagram showing a method of processing a view window according to the first embodiment of the present disclosure.

FIG. 4 illustrates a diagram showing a method of processing a view window according to the first embodiment of the present disclosure.

In the first embodiment, a 360-degree image 401 may be divided into total six areas (an area 1 411, an area 2 412, an area 3 413, an area 4 414, an area 5 415, and an area 6 416). The same type of parameter may be used for processing each area. Even though the same type of parameter is used, a value of the parameter may be different for each area.

Hereinafter, a method of processing a view window will be described assuming that a user changes from a view window 1 403 to a view window 2 405 while viewing the view window 1 403 and views the view window 2 405, and changes from the view window 2 405 to a view window 3 407 while viewing the view window 2 405 and views the view window 3 407. For example, this case is a case that the user does not move and a direction of a field of vision is just changed. If the user moves, a plurality of 360 degree-images other than the 360 degree-image 401 need to be used and processed. A method of using and processing the one 360 degree-image 401 will be described below.

A view window 1 403 which the user views among the 360 degree-image 401 is included in total one area (the area 4 414).

Thereafter, the view window 2 405 which the user views among the 360 degree-image 401 is across total two areas (the area 5 414 and the area 6 416).

Finally, the view window 3 407 which the user views among the 360 degree-image 401 is across total five areas (the area 1 411, the area 2 412, the area 3 413, the area 4 414, and the area 5 415).

In a case of the view window 1 404, the view window 1 403 is included in the area 4 414, so the view window 1 403 needs to be processed by considering only a parameter (e.g., illumination, and/or the like) of the area 4 414.

However, if the view window 2 405 is across two areas (the area 5 415 and the area 6 416), there is a need for a parameter of the area 5 415 and a parameter of the area 6 416 for processing the view window 2 405. That is, an image is processed using the parameter of the area 5 415 in part of the view window 2 405 which is across the area 5 415, and an image is processed using the parameter of the area 6 416 in part of the view window 2 405 which is across the area 6 416. Like this, if a plurality of areas are included in one view window and values of parameters of areas are different, an image mismatch-phenomenon may occur.

To prevent the image mismatch-phenomenon, the first embodiment provides a method for calculating a parameter value to be applied to the whole of the view window 2 405 based on a weight per area.

At least one of an area (or an area proportion), height (or a height proportion), width (or a width proportion), and/or the like which each area occupies may be considered for the weight per area. Alternatively, the weight per area may be a value defined by a provider which provides a 360 degree-image. Sum of weights of areas which compose a view window may be 1.

For example, it will be assumed that a weight per area is an area proportion when a parameter for processing the view window 2 405 is calculated. It will be assumed that the view window 2 405 is across the area 5 414 and the area 6 416 with the same width. If a parameter value of the area 5 415 is 5 and a parameter value of the area 6 416 is 9, a parameter value to be applied to the view window 2 405 may be 7 (=5*0.5+9*0.5). For another example, if a ratio of an area of the area 5 415 across which the view window 2 405 is to an area of the area 6 416 across which the view window 2 405 is stands at 7:3, the parameter value to be applied to the view window 2 405 may be 6.2 (=5*0.7+9*0.3). The view window 2 405 is processed by applying the calculated value of the parameter, not a value of a parameter per area to the whole view window 2 405.

Finally, if the view window 3 407 is across five areas (the area 1 411, the area 2 412, the area 3 413, the area 4 414, and the area 5 415), a value of a parameter of the view window 3 407 may be obtained like the calculation of the parameter value of the window 2 405.

For example, it will be assumed that a parameter value of the area 1 411 is 3, a parameter value of the area 2 412 is 7, a parameter value of the area 3 413 is 6, a parameter value of the area 4 414 is 8, and a parameter value of the area 5 415 is 5. Further, it will be assumed that a weight per area to be used for obtaining a value of a parameter of the view window 3 407 is an area proportion, the view window 3 407 is across the area 1 411, the area 2 412, the area 3 413, the area 4 414, and the area 5 415, and an area proportion of the area 1 411, the area 2 412, the area 3 413, the area 4 414, and the area 5 415 is 4:1:3:1:1. At this time, a parameter value to be applied to the view window 3 407 is 5 (=3*0.4+7*0.1+ 6*0.3+8*0.1+5*0.1). The view window 3 407 is also processed by applying the calculated value of the parameter, not the value of the parameter per area to the whole view window 3 407.

Unless the number of areas included in a view window or a size of the areas are rapidly changed even though time is changed, a parameter to be applied to all areas included in the view window is not rapidly changed in a case of applying a method of processing a view window according to the first embodiment of the present disclosure. So, the image mismatch-phenomenon as described above may be decreased.

Figure 5:
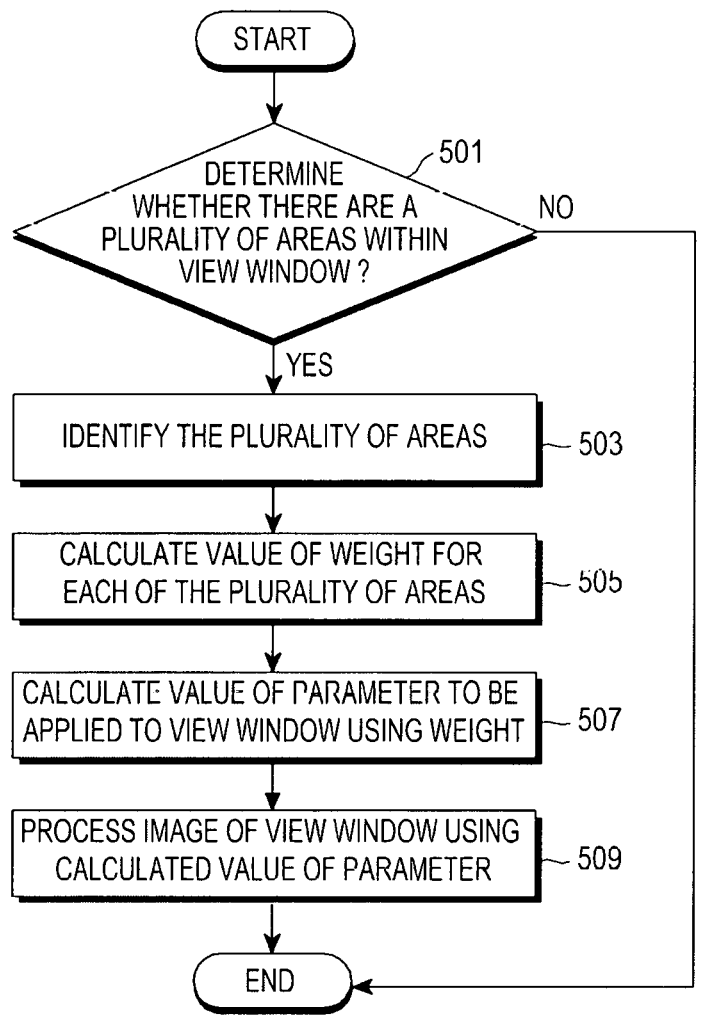
FIG. 5 illustrates a flow chart showing a method of processing a view window which is based on a weight per area according to the first embodiment of the present disclosure in a device.

FIG. 5 illustrates a flow chart showing a method of processing a view window which is based on a weight per area according to the first embodiment of the present disclosure in a device.

The device determines whether there are a plurality of areas within a view window (501).

If there are the plurality of areas within the view window, the device identifies the plurality of areas (503).

The device calculates a value of a weight for each of the plurality of areas (505). For example, if a weight is an area proportion, the device calculates a proportion of an area which the plurality of areas occupy within the view window.

The device calculates a value of a parameter to be applied to the view window using the weight (507).

The device processes an image of the view window using the calculated value of the parameter (509).

For example, if the method of processing the view window which is based on the weight per area is applied assuming that the parameter is peak luminance, a dynamic contrast is provided, so an image mismatch-phenomenon may be prevented. The peak luminance is an example of a parameter used for tone mapping. Further, the peak luminance may be a value considering a device which will display a view window.

Further, one of a parameter value of an area which is located at a center of a view window, a parameter value of an area with the largest portion among areas included in the view window, a predetermined parameter value, and/or the like may be used as a value of a parameter to be applied to all of the areas included in the view window.

Further, an image mismatch-phenomenon may occur in the following cases. Referring to (b) in FIG. 2, an area included in the first view window 211 at time t may be partially identical to (i.e., may be overlapped with) an area included in the second view window 213 at time t+1. In a case of processing the first view window 211 using the same parameter value regardless of an area for removing an image mismatch-phenomenon that it may be viewed like that the first view window 211 is divided into a plurality of areas, there is no problem if the parameter value is the same even though time changes. However, if the parameter value is not the same, much of the first view window 211 may be differently viewed at time t and time t+1, so an image mismatch-phenomenon may occur. For example, if a difference between an illumination value for processing all areas included in the first view window 211 at time t and an illumination value for processing all areas included in the second view window 213 at time t+1 is big, brightness of the same area included in all of the first view window 211 and the second view window 213 is differently viewed, so an image mismatch-phenomenon may occur. That is, an image mismatch-phenomenon may occur due to a change in the view window according to a change in time.

The second embodiment of the present disclosure is a method for processing an image of a view window by considering an edge area within a view window. In the present disclosure, an edge area is an arbitrary area which is newly defined within a view window, and a new area including a boundary line at which at least two areas included in the view window are touched.

Figure 6:
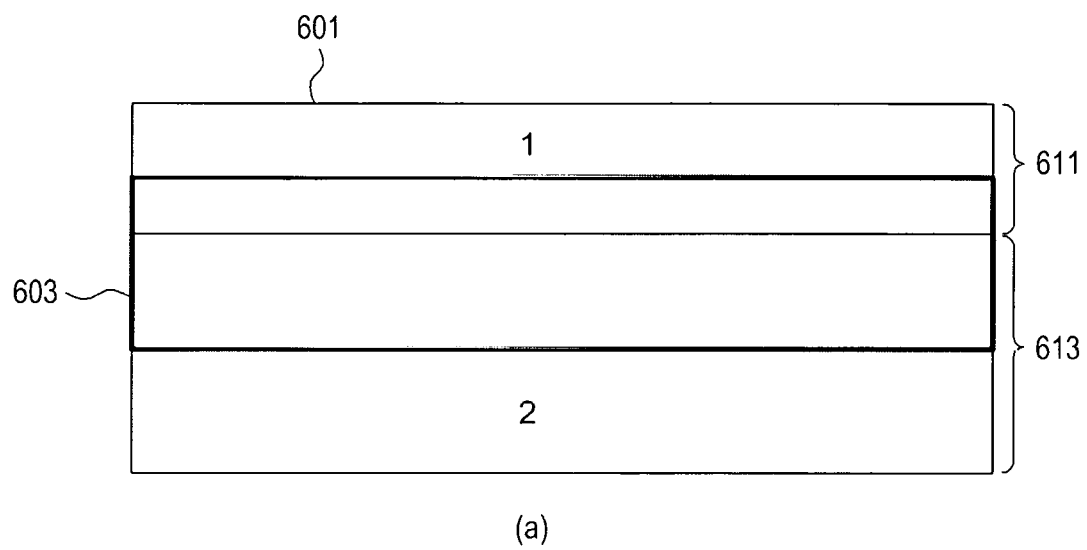
FIG. 6 illustrates a diagram showing a method of processing a view window according to the second embodiment of the present disclosure.
Figure 6:
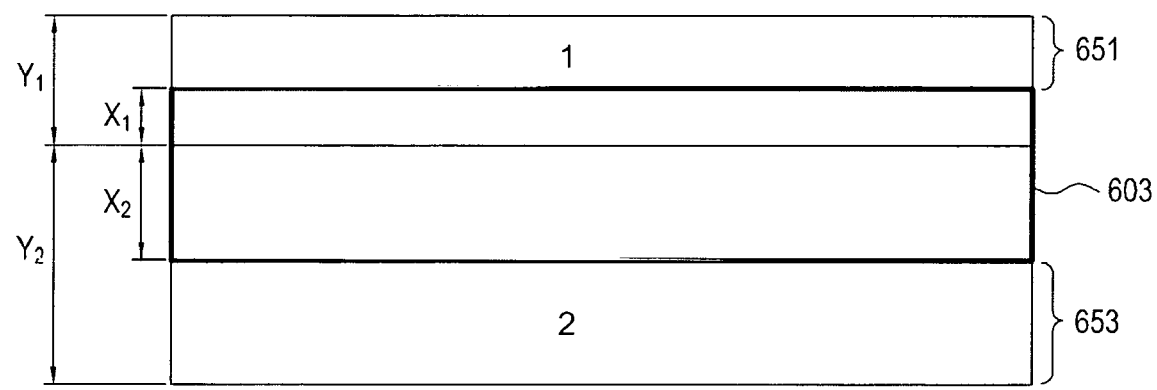

FIG. 6 illustrates a diagram showing a method of processing a view window according to the second embodiment of the present disclosure.

FIG. 6 illustrates a diagram showing an area of a view window as shown in (a).

The view window 601 includes two areas (an area 1 611 and an area 2 613) and an edge area 603 which is newly defined. The edge area 603 includes a boundary line 605 at which the two areas 611 and 613 are touched. That is, according to the second embodiment, it is identified how many edge areas exist within a view window, a size of each edge area is determined, and a value of a parameter (e.g., a blurring parameter) to be applied to each edge area is calculated.

In the second embodiment, a portion except for the edge area 603 of the view window 601 is processed by applying a parameter value of each area.

FIG. 6 illustrates a diagram showing an area according to a value of a parameter to be applied to the view window as shown in (b).

Part 651 of an area 1 is included in the view window 601, and is not included in the edge area 603. A parameter of the area 1 611 of FIG. 6(a) is used for processing an image of the part 651 of the area 1.

Part 653 of an area 2 is included in the view window 601, and is not included in the edge area 603. A parameter of the area 2 613 of FIG. 6(a) is used for processing an image of the part 653 of the area 2.

A parameter value for the edge area which is newly defined within the view window 601 may be determined as an average value of the parameter values of the area 1 611 and the area 2 613. In this way, an image mismatch-phenomenon which may occur at a boundary among different areas may be alleviated by placing a cushioning zone which is an edge area among the different areas which have different parameter values within the window 601.

A size of the edge area 603 may be determined based on areas included in the view window. And, (b) in FIG. 6 shows that the size of the edge area 603 is determined based on lengths ($Y_1$, $Y_2$) of areas included in the view window.

The size of the edge area 603 may be calculated using an edge area weighting factor. In (b) in FIG. 6, the size of the edge area 603 is proportional to the lengths ($Y_1$, $Y_2$) of areas included in the edge area 603. So, the size of the edge area 603 may be calculated using the lengths ($X_1$, $X_2$) of areas included in the edge area 603. For example, the edge area weighting factor is ⅓ as an arbitrary value, a length ($X_1+X_2$) of the edge area 603 is $Y_1*⅓+Y)*⅓$.

The edge area weighting factor may be at least one of an arbitrary value, a zoom level of a view window, height of the view window, width of the view window, and/or the like. Further, the edge area weighting factor may be a value determined by a provider which provides a 360-degree image.

A value of a parameter (e.g., a blurring parameter) to be applied to the edge area 603 of which the size is determined may be an average value of a value of a parameter of the area 1 611 and a value of a parameter of the area 2 613.

A method of processing a view window according to the second embodiment of the present disclosure changes a parameter value of an edge area included in a view window, so an image mismatch-phenomenon which occurs when all areas included in the view window are processed by applying the same parameter value may, not occur.

Figure 7:
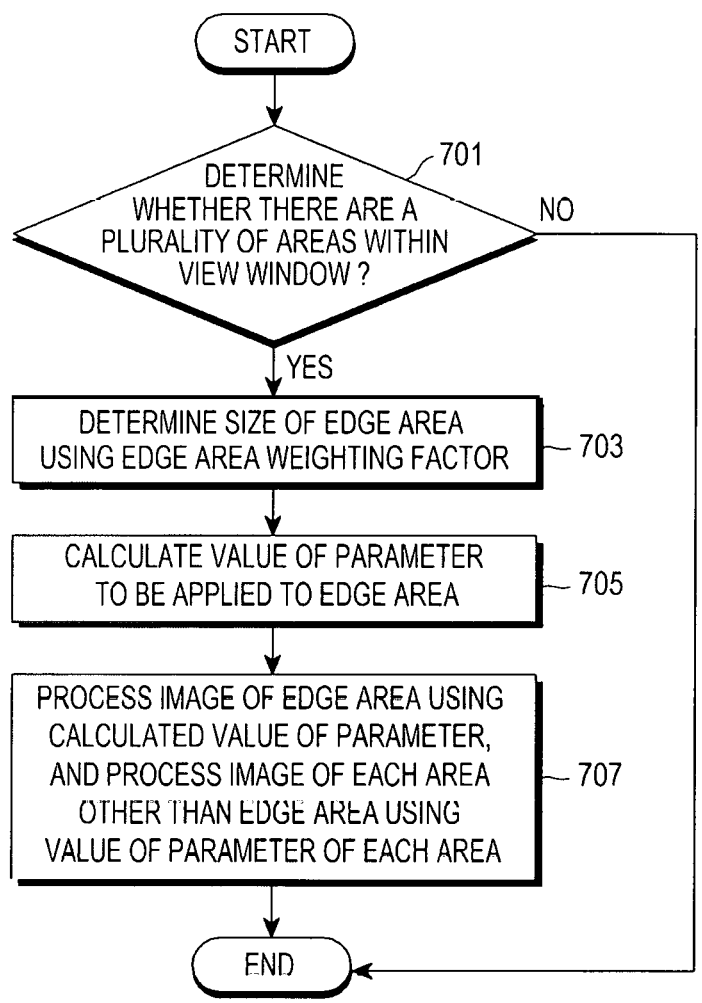
FIG. 7 illustrates a flow chart showing a method of processing a view window by considering an edge area according to the second embodiment of the present disclosure in a device.

FIG. 7 illustrates a flow chart showing a method of processing a view window by considering an edge area according to the second embodiment of the present disclosure in a device.

The device determines whether there are a plurality of areas within a view window (701).

If there are the plurality of areas within the view window, the device determines a size of the edge area using an edge area weighting factor (703).

The device calculates a value of a parameter to be applied to the edge area (705).

The device processes an image of the edge area using the calculated value of the parameter, and processes an image of each area other than the edge area using a value of a parameter for each area other than the edge area (707).

Figure 8:
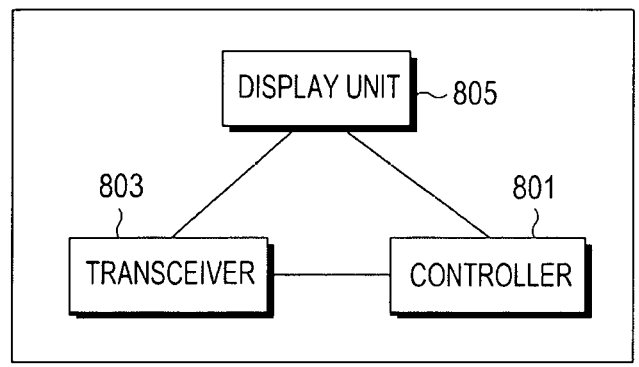
FIG. 8 illustrates a diagram showing a structure of a device according to the present disclosure.

FIG. 8 illustrates a diagram showing a structure of a device according to the present disclosure.

For convenience of description, components which are not directly related to the present disclosure will not be shown and described. Referring to FIG. 8, the device may consist of a controller 801, a transceiver 803, and a display unit 805. The display unit 805 may be configured as a separate device. Herein, the following operation may be performed by a plurality of components, however, the following operation may be performed in one component if necessary.

The controller 801 processes an image for displaying a view window on the display unit 805. Specifically, the controller 801 calculates a parameter to be applied to the view window, and processes the image using a value of the calculated parameter. The controller 801 may calculate a size of an edge area and process an image by applying a parameter to the edge area. Further, the controller 801 may control the transceiver 803 and the display unit 805.

The transceiver 803 may receive a 360 degree-image from another device, and the display unit 805 may display a view window.

The embodiments of the present disclosure described and illustrated in the specification and the drawings are mere examples provided to easily describe the technology of the present disclosure and help understanding of the present disclosure, not limiting the scope of the present disclosure. That is, those skilled in the art will understand that other modifications which are based on the technical spirit of the present disclosure may be implemented. Further, embodiments may be combined each other if necessary.

The invention claimed is:

1. A method for processing an image frame for a virtual reality content in an electronic device, comprising:

setting a view window in an image frame corresponding to a 360 degree image, the image frame including a plurality of first areas;

identifying at least one second area in an image which is a part of the image frame within the view window, wherein each of the at least one second area corresponds to a part of an area among the plurality of first areas, and the part of the area among the plurality of areas is within the view window;

obtaining at least one compensation parameter based on the at least one second area; and processing the image within the view window using the obtained at least one compensation parameter, wherein the at least one compensation parameter is based on at least one parameter set for each of the at least one second areas and a ratio of a size of each of the at least one second areas with respect to a size of the view window.

2. The method of claim 1, wherein the obtaining of the at least one compensation parameter comprises:

detecting a first area which overlaps the view window from the plurality of first areas; and setting a parameter of a target second area which is a part of the detected first area within the view window, based on a parameter which is preset for the detected first area.

3. The method of claim 2, wherein the obtaining of the at least one compensation parameter comprises:

calculating the ratio which each of the at least one second area has within the view window.

4. The method of claim 3, wherein the obtaining of the at least one compensation parameter for the view window comprises obtaining a weight to be applied to parameters which are set for each of the at least one second area by considering the ratio which is calculated for each of the at least one second area.

5. The method of claim 1, wherein the at least one compensation parameter is one of a parameter value of an area which is located at a center of the view window, a parameter value of an area with a largest proportion among areas included in the view window, and a predetermined parameter value, and wherein the at least one compensation parameter includes at least one of illumination, a deblocking filter parameter, a sharpening parameter, an unsharpening parameter, a blurring parameter, a denoising parameter, a color, a gamma correction parameter, and light.

6. The method of claim 1, wherein the processing of the image within the view window comprises:

determining a size of an edge area which exists in the at least one second area;

calculating a compensation parameter to be applied to the edge area by considering the determined size of the edge area; and processing an image of the edge area using the calculated compensation parameter.

7. The method of claim 6, wherein the size of the edge area is determined by considering a weight which is determined based on at least one of a random value, a zoom level of the view window, a height of the view window, and a width of the view window.

8. The method of claim 6, wherein the processing of the image within the view window comprises processing an image of a remaining part except for the edge area within the view window using a parameter set for the remaining part.

9. The method of claim 1, wherein the at least one compensation parameter is one of a parameter value of an area which is located at a center of the view window, a parameter value of an area with a largest proportion among areas included in the view window, and a predetermined parameter value.

10. The method of claim 1, wherein the at least one compensation parameter includes at least one of illumination, a deblocking filter parameter, a sharpening parameter, an unsharpening parameter, a blurring parameter, a denoising parameter, a color, a gamma correction parameter, and light.

11. An electronic device for processing an image frame for a virtual reality content, comprising:
a controller configured to:
set a view window in an image frame corresponding to a 360 degree image, the image frame including a plurality of first areas,
identify at least one second area in an image which is a part of the image frame within the view window, wherein the at least one second area corresponds to a part of an area among the plurality of first areas, and the part of the area among the plurality of areas is within the view window,
obtain at least one compensation parameter based on the at least one second area, and
process the image within the view window using the obtained at least one compensation parameter; and
a display unit configured to display the processed image,
wherein the at least one compensation parameter is based on at least one parameter set for each of the at least one second area and a ratio of a size of each of the at least one second area with respect to a size of the view window.

12. The electronic device of claim 11, wherein the controller is further configured to:
detect a first area which overlaps the view window from the plurality of first areas, and
set a parameter of a target second area which is a part of the detected first area within the view window, based on a parameter which is preset for the detected first area.

13. The electronic device of claim 12, wherein the controller is further configured to:
calculate the ratio which each of the at least one second area has within the view window.

14. The electronic device of claim 13, wherein the controller is further configured to obtain a weight to be applied to parameters which are set for each of the at least one second area by considering the ratio which is calculated for each of the at least one second area.

15. The electronic device of claim 11,
wherein the at least one compensation parameter is one of a parameter value of an area which is located at a center of the view window, a parameter value of an area with a largest proportion among areas included in the view window, and a predetermined parameter value, and
wherein the at least one compensation parameter includes at least one of illumination, a deblocking filter parameter, a sharpening parameter, an unsharpening parameter, a blurring parameter, a denoising parameter, a color, a gamma correction parameter, and light.

16. The electronic device of claim 11, wherein the controller is further configured to:
determine a size of an edge area which exists in the at least one second areas,
calculate a compensation parameter to be applied to the edge area by considering the determined size of the edge area, and
process an image of the edge area using the calculated compensation parameter.

17. The electronic device of claim 16, wherein the controller is further configured to process an image of a remaining part except for the edge area within the view window using a parameter set for the remaining part.

18. The electronic device of claim 11, wherein the at least one compensation parameter is one of a parameter value of an area which is located at a center of the view window, a parameter value of an area with a largest proportion among areas included in the view window, and a predetermined parameter value.

19. The electronic device of claim 11, wherein the at least one compensation parameter includes at least one of illumination, a deblocking filter parameter, a sharpening parameter, an unsharpening parameter, a blurring parameter, a denoising parameter, a color, a gamma correction parameter, and light.

20. The electronic device of claim 16, wherein the size of the edge area is determined by considering a weight which is determined based on at least one of a random value, a zoom level of the view window, a height of the view window, and a width of the view window.

* * * * *